Figure 1:
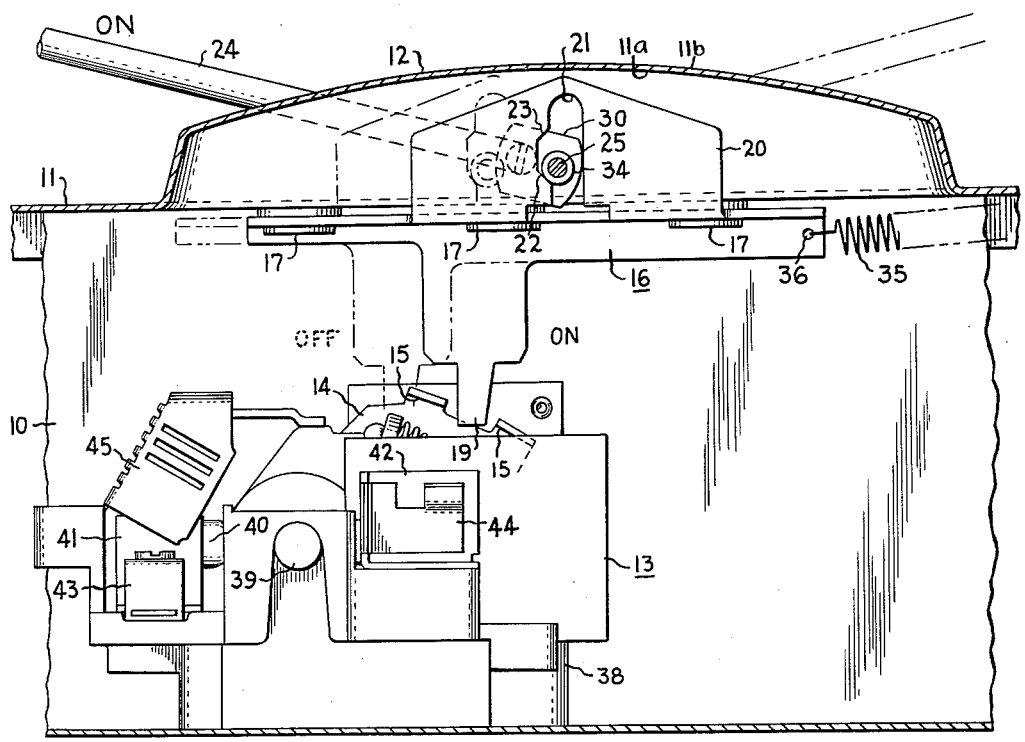

July 3, 1962

G. E. GAUTHIER 3,042,779

ENCLOSED ELECTRIC SWITCH

Filed Dec. 4, 1959

2 Sheets-Sheet 1

INVENTOR.
GEORGE E. GAUTHIER
BY
Robert A. Casey
ATTORNEY

July 3, 1962 G. E. GAUTHIER 3,042,779
ENCLOSED ELECTRIC SWITCH
Filed Dec. 4, 1959 2 Sheets-Sheet 2

INVENTOR.
GEORGE E. GAUTHIER
BY
Robert F. Casey
ATTORNEY

United States Patent Office 3,042,779
Patented July 3, 1962

3,042,779
ENCLOSED ELECTRIC SWITCH
George E. Gauthier, Plainville, Conn., assignor to General Electric Company, a corporation of New York
Filed Dec. 4, 1959, Ser. No. 857,395
5 Claims. (Cl. 200—172)

My invention relates to enclosed electric switches and particularly to electric switches of the type comprising an electric switch unit enclosed in a metallic enclosure having a cover and including means carried by the cover for operating the switch unit within the enclosure, such, for example, as shown in copending application Serial No. 857,396, filed December 4, 1959, and assigned to the same assignee as the present invention.

In switches of this type, it is desirable that means be included for maintaining the U-shaped operating handle in a predetermined position even when the cover of the enclosure is opened and the handle mechanism is disengaged from the switch operating mechanism in the enclosure. This is for the purpose of ensuring that the handle will be in the same position as the switch is when the door is reclosed. In accordance with the prior constructions, a relatively complicated linkage is required to provide this function.

As used herein, the term "switch" or "electric switch" means any device which is repetitively operable to make and break an electric circuit, whether or not such device includes means for automatic operation, and includes switching devices known as "circuit breakers."

It is an object of the present invention to provide an enclosed electric switch of this type in which means is provided for retaining the handle in a predetermined position without the necessity of extra linkages provided for this purpose.

It is also an object of the invention to provide an enclosed switch of the type described above which includes handle biasing means which is operable even though the operative relation of the handle to the switch is reversed.

In accordance with the invention, an enclosed electric switch is provided including an enclosure, a switch unit contained within the enclosure, a cover, and an operating handle pivotally supported on the cover. A connection is provided between the handle and the switch unit including a slidable operating member carried by the cover and adapted to interengage and actuate the switch contained within the enclosure. An eccentric cam member is carried by the handle which is adapted to operate in a slot in the slidable member so that the slidable member is reciprocated upon rocking motion of the handle. The slot is further provided with an offset or notch of predetermined shape and a tension spring is provided biasing the slide to one extreme position. Under the action of the spring, the offset portion of the notch acts on the handle cam to provide the desired handle-biasing action.

The invention will be more fully understood from the following detailed description and its scope will be pointed out in the appended claims.

Figure 2:
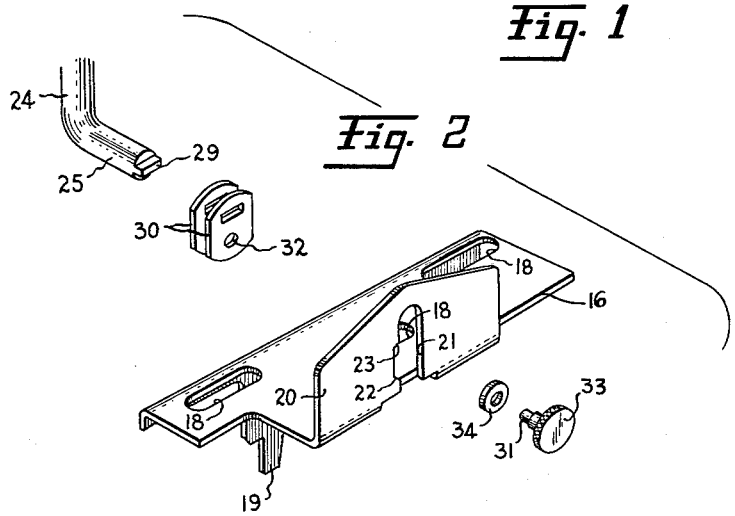
Figure 3:
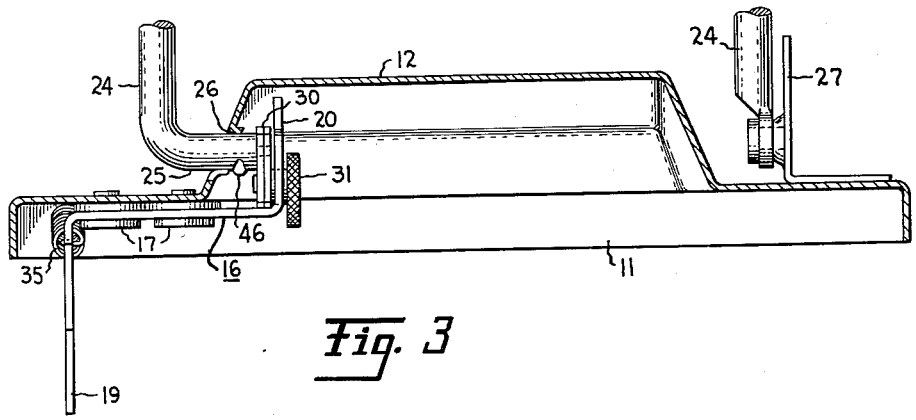
Figure 4:
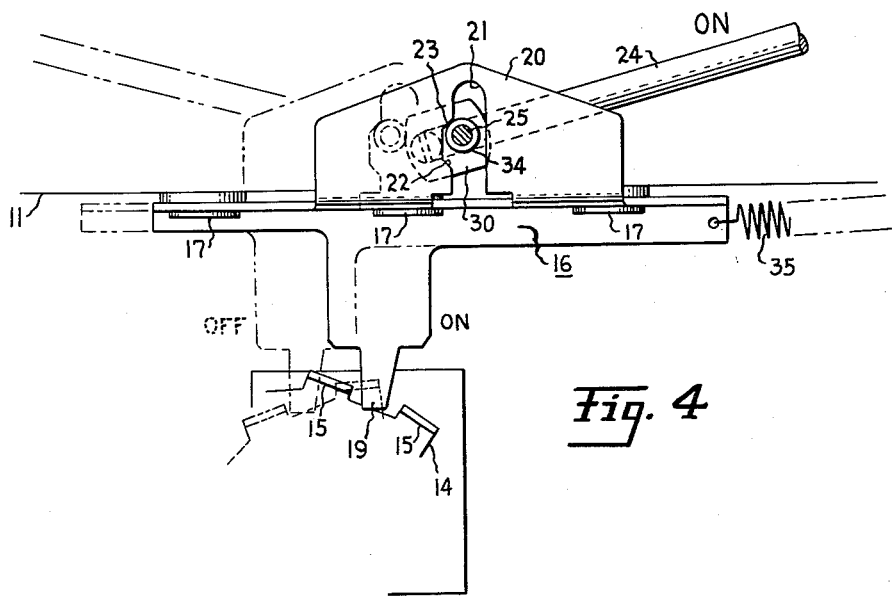

In the drawings:
FIGURE 1 is a side elevation view, partly in section, of an electric switch embodying the invention;
FIGURE 2 is an exploded perspective view of portions of the mechanism of FIGURE 1;
FIGURE 3 is a fragmentary sectional view of a portion of the mechanism of the switch of FIGURE 1;
FIGURE 4 is a partial elevation view of the mechanism of the switch of FIGURE 1 in a "reversed" condition.

In the drawings, the invention is shown as embodied in an enclosed electric switch including an enclosure 10 provided with an openable cover 11 having a generally cup-shaped dome or "bump" 12. An electric switch unit 13 is supported on the back wall of the enclosure 10 and is provided with an operating mechanism including an operating member 14 pivotally supported upon the side wall of the enclosure 10 and having two spaced apart lugs 15 to facilitate operation thereof. The switch unit supported in the enclosure may be of any suitable type such as a conventional switch or circuit breaker. The particular switch unit shown is similar to that shown in copending application Serial No. 857,384, filed December 4, 1959, and assigned to the same assignee as the present invention.

The switch unit 13 includes an insulating base 38 having a contact rotor 39 rotatably supported thereon and carrying bridging contact members 40, only one shown. The contact members 40 are adapted to bridge and interconnect a pair of spaced relatively stationary contacts 41 and 42, which in turn are connected to terminals 43 and 44, respectively. An arc chute 45 is also provided for each of the stationary contacts.

The rotor 39 is adapted to be operated by suitable operating means including an operating plate 14 pivotally supported on a side wall of the enclosure 10 and operatively connected to the rotor 39, and including a pair of upturned spaced-apart lugs 15.

For the purpose of operating the switch unit 13 through the agency of plate 14, mechanism is provided including a slidable operating member indicated generally at 16. The operating member 16 is slidably supported on the generally planar inner surface portion of the cover 11, to one side of the bump portion 12, by means of headed rivets 17 passing through elongated slots 18 (see FIGURE 2) in the member 16, the ends of the slots 18 serving to limit the movement of the sliding member 16.

The slidable operating member 16 also includes a depending operating projection 19 which extends between the lugs 15 of the operating member 14. The member 16 also includes an upstanding vertical wall portion 20, which is provided with an elongated open-ended slot 21 having an offset portion to provide two angularly directed shoulder portions 22 and 23, for a purpose to be described.

The sliding operating member 16 is adapted to be operated by means of a generally U-shaped or bail-shaped operating handle 24, which has one end 25 bent inwardly and pivotally supported in a bearing aperture 26 formed in a side wall portion of the cover bump 12. The opposite end of the handle 24 is pivotally supported upon a supporting bracket 27 on the generally planar peripheral portion of the cover 11.

The inturned end 25 of the handle 24 acts as an operating shaft, and is provided with a generally rectangular shouldered projection 29 which is adapted to receive a two-part link 30. A headed pin 31 is mounted in aligned apertures 32 in the link 30 and has an enlarged head portion 33. The pin 31 carries a roller 34 which is positioned within the slot 21. The link 30 is shown as made up of two identical parts for ease of manufacture, but may be readily made as one piece.

The sliding operating member 16 is biased at all times to the right as viewed in FIGURE 1 by means of tension spring 35 which has one end portion hooked into an aperture 36 in the sliding member 16 and has its other end (not shown) suitably anchored to a fixed portion of the cover 11.

Referring to FIGURE 1, the parts are shown with the switch assumed to be in the "on" position. Rotation of the operating handle 24 clockwise as viewed about the axis of the end 25, rotates the roller 34 in a clockwise direction, moving the sliding operating member 16 to the left as viewed. When the handle 24 reaches the opposite extreme position, representing the "off" position of the switch, the parts of the mechanism will be in the condition indicated in dotted lines in which the roller 34 is again in contact with the shoulder 22 of the slot 21.

The switch unit 13 utilized in the enclosure 10 is preferably of the type having a snap-acting overcenter spring mechanism. The operating member 14 including the operating fingers 15 will therefore be securely held by such an operating spring in either of its two possible extreme positions. Since the projection 19 of the operating member 16 is retained between the fingers 15 during normal operating conditions of the switch, the retaining operating spring of the switch unit 13 will also act to hold the operating slide 16 and the handle 24 in each of its two extreme possible positions. When the switch cover 11 is opened, however, it will be apparent that the action of gravity will tend to move the handle 24 from one position toward the other, depending upon its orientation.

Referring again to the normal solid line position as shown in FIGURE 1, it will be observed that the action of the tension spring 35 is to move the sliding operating member 16 toward the right at all times. It will also be noted that the angle of contact of the shoulder 22 on the roller 34 is substantially at 45 degrees with direction of the slot 21 and is in such a direction with respect to the axis of the portion 25 as to exert a force on the roller 34 upwardly, toward the inner surface 11a of the cover 11 and to bias the handle 24 in a counterclockwise direction toward the outer surface 11b of the cover 11 as a result of the bias exerted by the tension spring 35. As the roller 34 moves out of the notch in the slot 21 and against the straight side wall of the slot as the handle continues its rotation toward the "off" position, the bias on the handle 24 in counterclockwise direction is continued, until the handle approaches the end of its travel in a clockwise direction and the roller drops into the notched portion of the slot 21 once more and comes to rest against the shoulder 22, at which time the bias of the sliding operating member 16 upon the roller 34 will be seen to be in the position to retain the handle 24 in its opposite extreme position. Thus, it will be observed that the shoulder 22 contacts the roller 34 at an angle when the handle is in one position so as to bias it in a counterclockwise direction, and when the handle is in the other position so as to bias it in a clockwise direction. If the slot 21 were provided only with straight side walls, the bias of the member 16 against the roller 34 would be such as to exert a counterclockwise bias on the handle 24 at all times during the described movements of the handle, which are less than 180 degrees. By means of the construction shown, I have provided a bias-increasing and bias-reversing action which holds the handle 24 in its opposite extreme positions as desired, without the necessity of added linkage for this purpose.

It is a further feature of the invention that means is also included for providing a desired reversing bias on the handle member when the action of the handle with respect to the slide 16 is reversed such as by reversing the links 30 in the manner set forth in the above-mentioned copending application.

Accordingly, referring to FIGURE 4, the switch illustrated in FIGURE 1 is shown with the link 30 reversed 180 degrees with respect to the projection 29 on the end 25 of the handle. It will be observed that by comparison to FIGURE 1, the switch unit 13 is in the same position which is assumed to be the "on" position, although the external handle 24 is now in the opposite position.

For the purpose of providing the bias action desired when the action of the switch is reversed as described above, there is provided a second angular shoulder 23 which is in engagement with the roller 34 when the handle is in its extreme positions. It will be observed that with the handle in the "on" position, the result of the bias of the tension spring 35, because of shoulder 23, is to exert a force on the roller 34 tending to bias the handle 24 in a clockwise direction.

When the handle is moved to its opposite extreme position, shown in dotted lines, the roller moves out of the notched portion of the slot 21 against the straight side wall portion of the slot and at its other extreme of movement, again drops into the notched portion of this slot and into engagement with the shoulder 23. When the shoulder 23 is in contact with the roller 34 in the "off" position of the switch, it will be observed that the force of the member 16 acting on the roller 34 is such as to bias the handle 24 in a counterclockwise direction.

The handle end 25 is provided with a minor projection 46, and the aperture 26 is provided with a corresponding notch at the point of said aperture closest to the peripheral portion of the cover 11, see FIGURE 3.

In order to "reverse" the operating mechanism, it is only necessary to move the handle 24 to its mid-position, in which the projection 46 is in line with the notch in aperture 26, and to pull the end 25 of the handle outwardly against its own resilient bias. The handle may be thus "sprung" without deformation enough to withdraw the projection 29 from the opening in the link 30. The link 30 may then be removed and replaced or simply rotated 180 degrees by means of knurled head 33 on pin 31 which is rigidly attached to the link 30. The handle end 25 is then re-inserted in the hole in the link 30.

The projection 46 and the corresponding notch in the opening 26 require that the handle be held in a mid-position in order that the end be withdrawn from the aperture 26. Since the handle never otherwise is stationary in a mid-position, and since the handle end cannot be withdrawn at either extreme position, this guards against any accidental disengagement of the handle from the link 30 while readily permitting it when desired.

It is apparent that modifications of this invention may be made without departing from the spirit of the invention. It is therefore intended by the appended claims to cover all such modifications as fall within the true spirit and scope of the invention.

What I claim as new and desire to secure by Letters Patent of the United States is:

1. An enclosed electric switch comprising a generally box-like enclosure having an open top wall, an openable cover supported on said enclosure and normally closing said open top wall, an electric switch unit mounted within said enclosure and including an operating member movable between "on" and "off" positions, a manually operable handle supported on said cover and movable between two extreme positions corresponding to said "on" and "off" positions of said switch unit operating member, an intermediate operating member slidably mounted on the inner surface of said cover and having an elongated aperture therein, a cam roller positioned in said elongated aperture, means connecting said cam roller for operation by said manually operable handle member to cause reciprocating sliding movement of said intermediate operating member upon movement of said manually operable member, spring means constantly biasing said sliding intermediate operating member in one direction of movement thereof, said elongated aperture having an inclined wall portion adapted to act on said cam roller when said handle is in either of said extreme positions to urge said cam roller in a direction to maintain said handle in such extreme position.

2. An enclosed electric switch comprising an enclosure, an electric switch unit mounted in said enclosure, an openable cover supported on said enclosure, said switch unit comprising an operating member movable between "on" and "off" positions, an intermediate operating member slidably mounted on the inner surface of said cover and including a portion having a releasable connection with said operating member of said switch unit, a manually operable member pivotally supported on said cover and movable between two extreme positions corresponding to said "on" and "off" positions of said switch unit operating member, said manually operable member including an operating shaft portion extending through said cover, said intermediate operating member having an elongated cam slot, a cam roller positioned in said slot, means connecting said cam roller for actuation by said manually operable member, said cam slot having a first cam portion extending substantially perpendicular to said top wall and an inclined second cam portion inclined at an angle to said top wall, spring means constantly biasing said intermediate operating member for sliding movement in one direction of its movement, said inclined cam portion being positioned to act on said cam roller when said manually operable handle is in each of its two extreme positions and serving to translate the bias of said spring into a force directed on said cam roller in a direction toward the inner surface of said cover so as to urge the outer portion of said operating handle toward the outer surface of said cover when said handle is in each of said extreme positions.

3. An enclosed electric switch comprising a generally rectangular enclosure, an electric switch unit mounted in said enclosure and including an operating member movable between "on" and "off" positions, an openable cover supported on said enclosure, slidable operating means slidably carried by the inner surface of said cover and including a portion adapted to releasably coact with said operating member of said switch unit, said slidable operating member being movable between first and second extreme positions, a manually operable handle pivotally supported on said cover and movable between two extreme positions corresponding to said "on" and "off" positions of said switch unit operating member, and including an operating shaft portion rotatable on an axis parallel to said cover, a crank arm carried by the inner end of said operating shaft portion and a cam roller mounted on said crank arm at a point eccentric to said operating shaft axis, said slidable operating member having an elongated cam slot therein, said cam roller being positioned within said cam slot, whereby movement of said manually operable handle between first and second extreme positions causes movement of said slidable operating member between first and second extreme positions, said crank arm being selectively mountable on said operating shaft portion in one of two relatively displaced positions and said cam slot being adapted to receive said cam roller when said crank arm is in each of said displaced positions, whereby the relative positions of said slidable member and said manually operable member may be selectively altered at will, spring means constantly urging said slidable operating member toward one of said extreme positions, said cam slot having a first angularly directed cam surface formed to transmit said bias of said spring means into a force on said cam roller directed so as to urge said manually operable member for rotation toward the outer surface of said cover in each of said extreme positions of said manually operable member when said crank arm is mounted in one of said two positions, and a second angularly directed cam surface formed to transmit said bias of said spring means into a force on said cam roller directed so as to urge said manually operable member for rotation toward the outer surface of said cover in each of said extreme positions of said manually operable member when said crank arm is mounted in the other of said two positions.

4. An enclosed electric switch comprising an enclosure, an electric switch unit mounted in said enclosure and including an operating member movable between "on" and "off" positions, an openable cover supported on said enclosure, a slidable operating member carried by the inner surface of said cover and including a portion releasably engageable with said operating member of said switch unit, said slidable operating member having an elongated cam slot therein, a cam roller positioned in said cam slot, a manually operable member pivotally supported on said cover and movable between two extreme positions corresponding to said "on" and "off" positions respectively, means interconnecting said manually operable member and said cam roller to cause reciprocating slidable movement of said slidable operating member upon rotational movement of said handle, said manually operable member including an operating shaft portion extending through said cover rotatable on an axis extending parallel to the general plane of said cover, a connecting link non-rotatably connected to the inner end of said operating shaft portion and carrying said cam roller thereon at a point eccentric to said operating shaft axis, said connecting link being selectively mountable in either of two positions on said operating shaft displaced 180 degrees from each other, said cam slot being dimensioned to receive said cam roller when said connecting link is in each of its possible positions, said cam slot having opposed straight wall portions to facilitate reciprocating slidable movement of said slidable operating member upon rotational movement of said manually operable member, said cam slot also having a first inclined cam portion adapted to coact with said cam roller when said manually operable handle is in each of its two possible extreme positions to urge said handle further in said directions when said connecting link is in one of its said positions, spring means urging said slidable operating member constantly for movement toward one of its extreme positions, a second inclined cam surface in said elongated slot and disposed to act on said cam roller when said manually operable member is in either of its two opposed positions to urge said manually operable member for movement toward said cover when said connecting link is in the other of its possible positions.

5. An enclosed electric switch comprising an enclosure, an electric switch unit mounted in said enclosure and including an operating member movable between "on" and "off" positions, an openable cover supported on said enclosure, a slidable operating member carried by the inner surface of said cover and including a portion releasably engageable with said operating member of said switch unit, said slidable operating member having an elongated cam slot therein, a cam roller positioned in said cam slot, a manually operable member pivotally supported on said cover, means interconnecting said manually operable member and said cam roller to cause reciprocating slidable movement of said slidable operating member upon rotational movement of said handle, said manually operable member including an operating shaft portion extending through said cover rotatable on an axis extending parallel to the general plane of said cover, a connecting link non-rotatably connected to the inner end of said operating shaft portion and carrying said cam roller thereon at a point eccentric to said operating shaft axis, said connecting link being selectively mountable in either of two positions on said operating shaft displaced 180 degrees from each other, said cam slot being dimensioned to receive said cam roller when said connecting link is in each of its possible positions, said cam slot having opposed straight wall portions to facilitate reciprocating slidable movement of said slidable operating member upon rotational movement of said manually operable member, said cam slot also having a first inclined cam portion adapted to coact with said cam roller when said manually operable handle is in each of its two possible extreme positions to urge said handle further in said directions, spring means urging said slidable operating member constantly for movement toward one of its extreme positions, a second inclined cam surface in said elongated slot disposed to act on said cam roller when said manually operable member is in either of its two opposed positions to urge said manually operable member for movement towards said cover when said connecting link is in the other of its possible positions, said operating shaft portion including a key projection thereon, said cover having an aperture therein of corresponding shape with an enlargement to permit passage of said projection, the location of said enlargement being such as to require that said handle be maintained in an intermediate position between its extreme positions in order to be retracted through said opening.

References Cited in the file of this patent

UNITED STATES PATENTS

| | | |
|---|---|---|
| 2,237,530 | Olley | Apr. 8, 1941 |
| 2,917,593 | Groves et al. | Dec. 15, 1959 |

FOREIGN PATENTS

| | | |
|---|---|---|
| 162,356 | Sweden | Mar. 4, 1958 |